F. C. MATTERN.
COTTON SEED WEIGHING APPARATUS.
APPLICATION FILED APR. 26, 1917.

1,328,747.

Patented Jan. 20, 1920.
4 SHEETS—SHEET 1.

WITNESS

INVENTOR:
Frank C. Mattern,
BY
Marble & Everett,
ATTORNEYS.

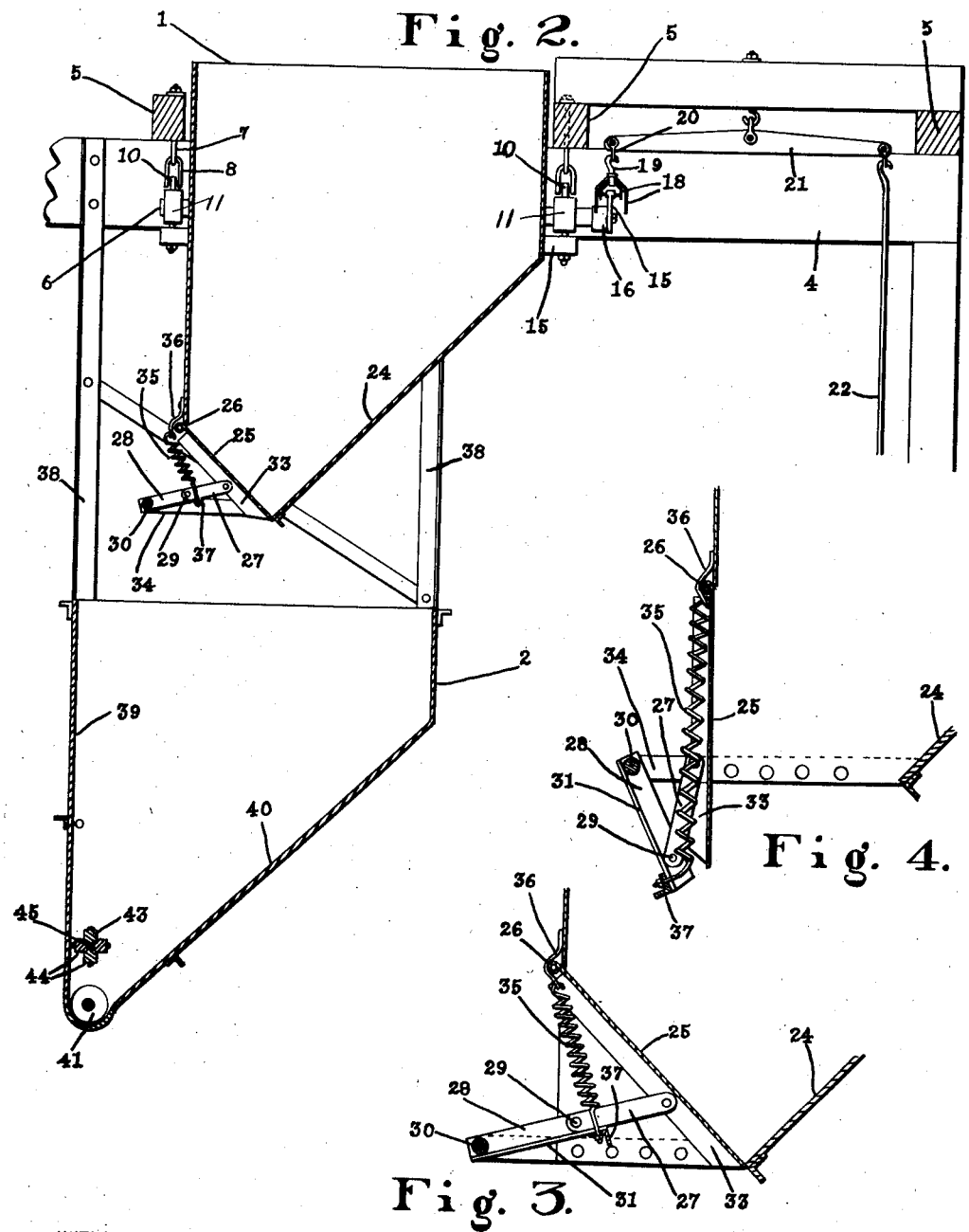

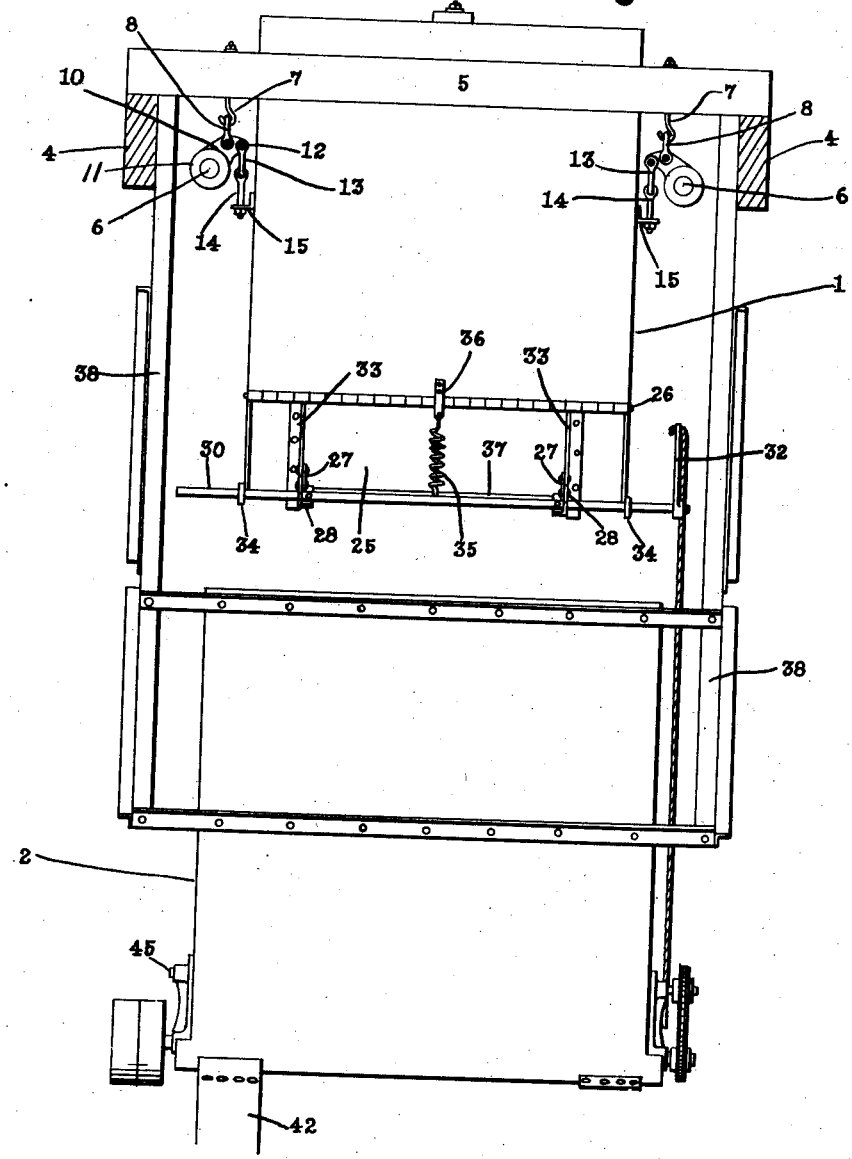

UNITED STATES PATENT OFFICE.

FRANK C. MATTERN, OF GREAT NECK, NEW YORK, ASSIGNOR TO FAIRBANKS COMPANY, A CORPORATION OF NEW YORK.

COTTON-SEED-WEIGHING APPARATUS.

1,328,747.

Specification of Letters Patent. Patented Jan. 20, 1920.

Application filed April 26, 1917. Serial No. 164,611.

*To all whom it may concern:*

Be it known that I, FRANK C. MATTERN, a citizen of the United States of America, and a resident of Great Neck, in the county of Nassau and State of New York, have invented new and useful Improvements in Cotton-Seed-Weighing Apparatus, of which the following is a specification.

The objects of this invention are to provide improved means particularly adapted for receiving cotton seed at the gin and determining the weight of the seed; to provide means for relieving the scales of the seed quickly and at any desired time; to provide an improved automatic closure for the bottom of the weighing hopper which will lock against the pressure of the cotton seed to open it, but which is readily opened by the operator when it is desired to discharge the cotton seed; to prevent the cotton seed from choking or clogging in the receiving hopper; to provide a simple weighing device which is easily and readily understood and operated; to economize floor space and permit arranging the parts to suit varying conditions, and to obtain other advantages and results as may be brought out in the following description.

Referring to the accompanying drawings, in which like numerals of reference indicate the same parts throughout the several views, Figure 1 is a view in elevation of a cotton seed weighing apparatus embodying my invention, one of the supporting beams being broken away in part;

Fig. 2 is a view looking in the same direction as Fig. 1, showing the apparatus in central section, without the scale;

Fig. 3 is a similar sectional view, on larger scale, of a portion of the apparatus showing a certain gate in closed position;

Fig. 4 is a sectional view similar to Fig. 3 showing the gate open;

Fig. 5 is an elevation looking at the left hand side of the apparatus as viewed in Fig. 1;

Figure 1:
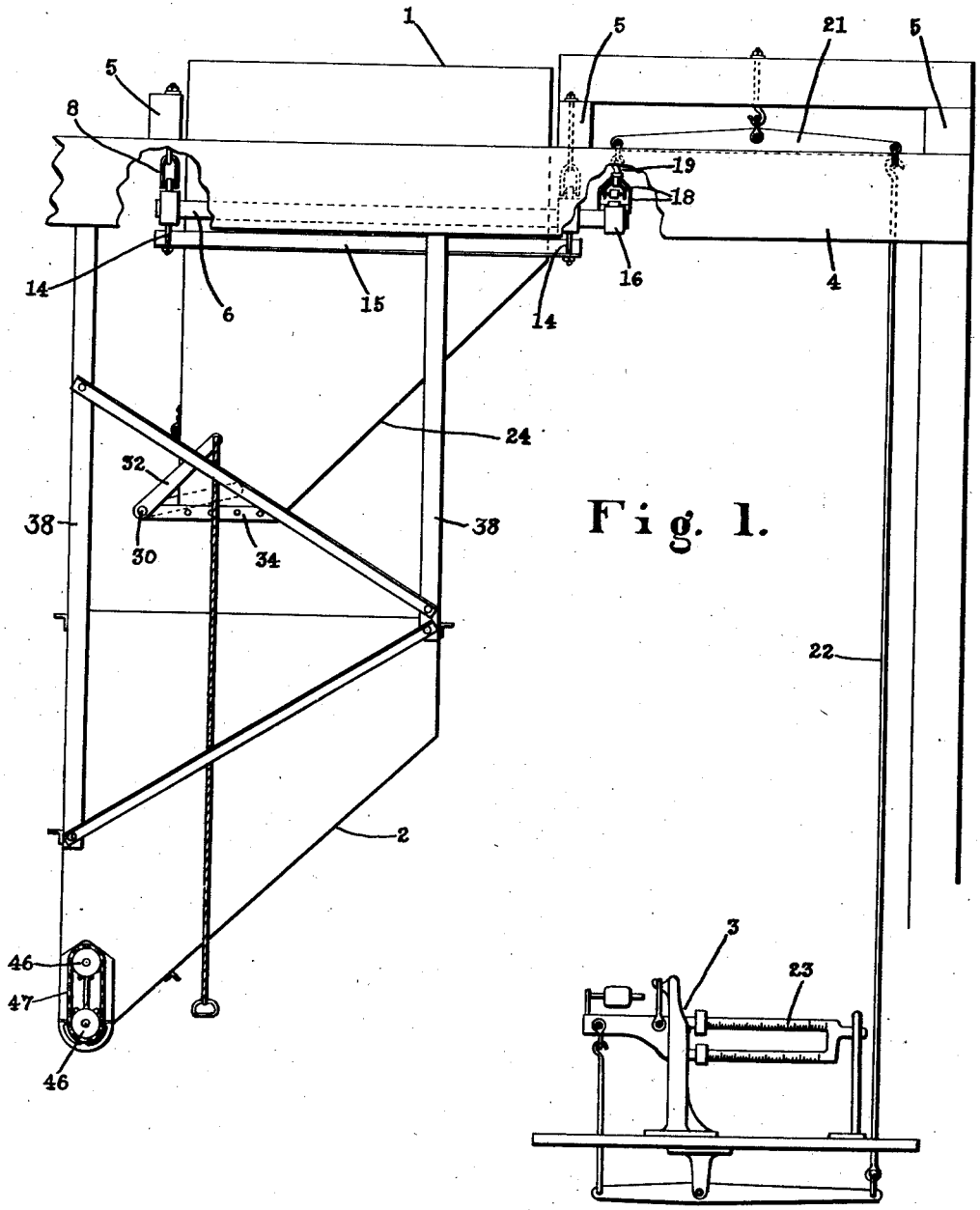
Figure 6:
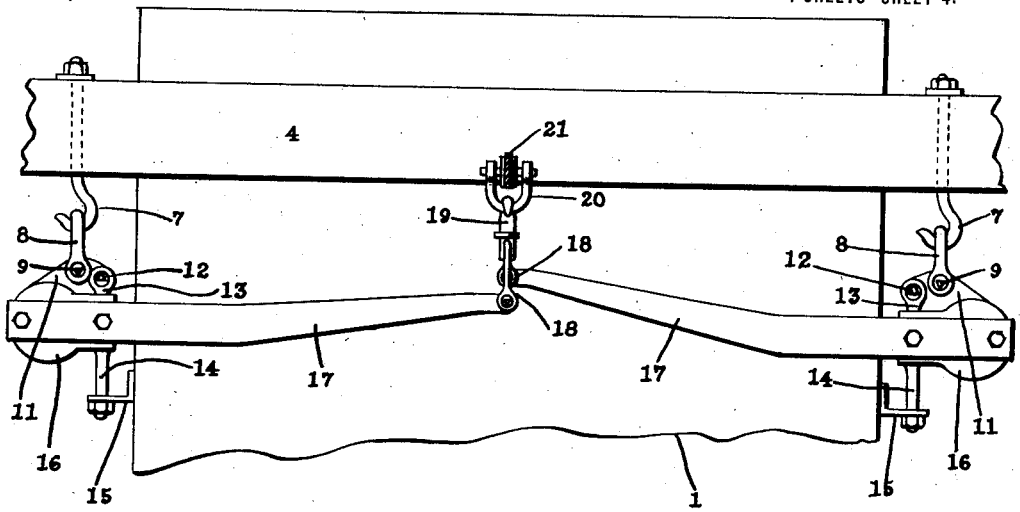
Fig. 6 is a view looking at the upper part of the hopper from the right hand side of Fig. 1 but upon larger scale.
Figure 8:
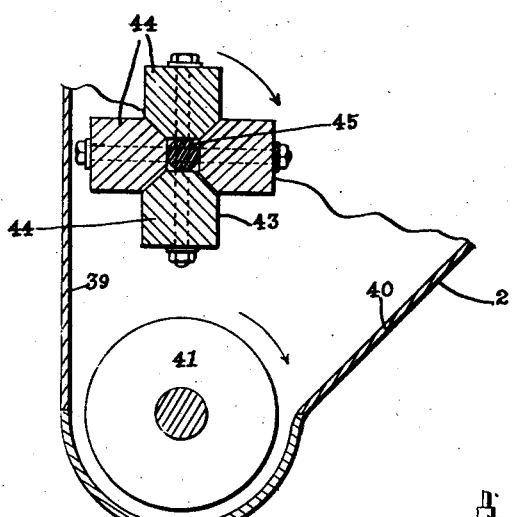
Fig. 8 is a vertical section of the lower portion of the receiving hopper similar to Fig. 2, but upon larger scale.
Figure 7:
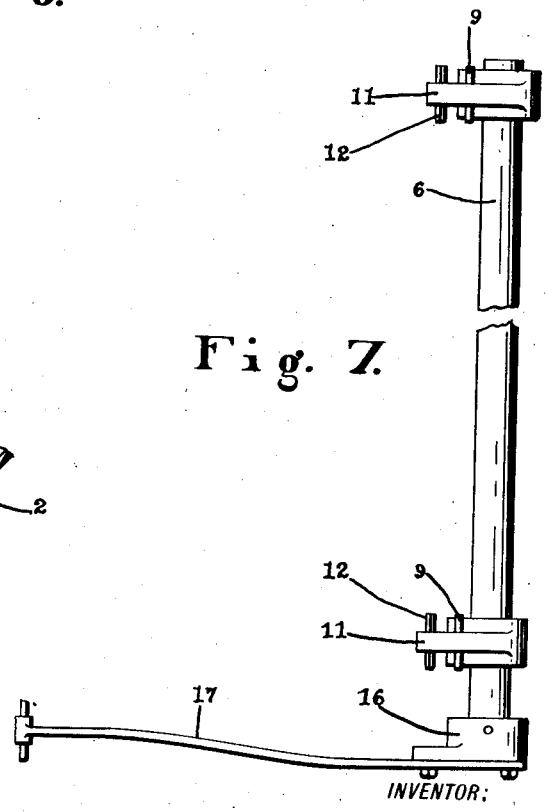
Fig. 7 is a plan of a portion of the hopper supporting means shown in Fig. 6.

In the specific embodiment of the invention illustrated in said drawings, the reference numerals 1, 2 indicate weighing and receiving hoppers respectively, the former being suspended by suitable connections so as to be balanced by a scale 3 of any desired construction, and the latter being supported in fixed position beneath the weighing hopper. Cotton seed is fed into the upper or weighing hopper 1 and its weight ascertained by the scale 3, after which said seed is permitted to dump quickly into the receiving hopper 2, from whence it can be disposed of at leisure the weighing hopper in the meantime being free to receive more seed to be weighed. Obviously the upper or weighing hopper must discharge the seed quickly, so no interruption be caused in the operation of the plant supplying the seed to the weighing hopper.

It is preferable, in most instances at least, to suspend the hoppers from above so as to avoid taking up a great deal of floor space, and while in the drawings I have shown a system of supporting beams, I do not wish to be understood as restricting myself thereto, in that most installations will utilize the existing beams and rafters which form part of the ceiling of the mill. For illustrative purposes, longitudinal beams 4, 4 are provided spaced sufficiently to receive the weighing hopper between them, and carried transversely across these longitudinal beams are rafters 5, 5, 5, between two of which, also, the weighing hopper may move.

Rocker shafts 6, 6 are mounted horizontally at and preferably parallel to two opposite sides of the weighing hopper near its top, the support for them being shown as hooked bolts 7, 7 depending from the rafters 5, 5. The hooks of said bolts 7, 7 each carry a yoke 8 providing spaced and parallel arms apertured in alinement adjacent their lower free ends for receiving the ends of a supporting knife 9 which ends project from opposite sides of a web 10 formed integrally with a sleeve 11 fast upon the said rocker shaft. It is to be noted that as shown in the drawings, the webs 10 project toward the weighing hopper, and further toward the end of the webs than said knives 9 are other similar knives 12 also projecting laterally from the webs. These knives support yokes 13 each of which pass through the eye of an eye-bolt 14 in turn supporting horizontally disposed strips 15 fast upon two opposite sides of the weighing hopper.

Preferably the supporting strips 15 are each of angle iron with one flange secured flatwise to the hopper and the other flange projecting horizontally outward, and apertured near its ends to receive the eye bolts 14. It may here be noted that the strips 15, 15 are at two of the sides of the hopper and the rocker shafts 6, 6 are at the other two sides of the hopper.

At corresponding ends of the rocker shafts 6, 6, are secured caps 16, 16 to which are bolted or otherwise secured levers 17, 17 extending toward each other at the side of the hopper and arranged so their inner ends overlap one another, preferably one above the other as shown. Laterally projecting knives at the overlapping ends of the levers engage in suitable yokes 18, 18 free to swing toward the rocker shafts and carried by a hook member 19 hooked into a yoke 20 suspended from knife edges of a teeter beam 21 which extends in the same general direction as the rocker shafts away from the hopper. This teeter beam 21 obviously is positioned with one end over the overlapping ends of the levers 17, 17 and is furthermore fulcrumed at about its middle and is connected by a link 22 at its other end to the scale 3. Obviously as cotton seed is introduced into the hopper, the weight draws down upon the eyebolts 14 and yokes 13, tending to swing the rocker shafts upward, and these shafts in turn tend to swing the attached levers 17, 17 downward at their overlapping ends. This movement transmitted to the teeter beam will draw upward upon the link 22 tending to swing the beam 23 of the scale 3 upward. Addition of more weight to the free end of the scale beam counterbalances this tendency and will obviously indicate the weight of seed contained in the hopper.

Preferably the upper part of the weighing hopper in plan view is square so it may be turned whichever way found most desirable upon any installation. For the lower part of the hopper, what may be termed the back wall and the two side walls extend straight down in the same planes with the upper parts thereof, but the other or front wall slopes for its lower part 24, inwardly toward the back wall. Furthermore, the lower edge of the front wall 24 is lower than the lower edge of the back wall, the lower edges of the side walls sloping to correspond with the slope of the front wall to its bottom edge and then extending horizontally rearward, that is, not following the upward slope to the back wall, see Figs. 3 and 4.

A gate 25 is hinged as at 26 at its upper edge to the lower edge of the short or back wall and adapted to swing forwardly against the bottom edge of the sloping front wall 24. When the gate is opened, it swings downward between the side walls into substantial alinement with the vertical back wall, forming a baffle to prevent the cotton seed from shooting over the top of the receiving hopper, but at the same time providing a large opening in the weighing hopper so it will discharge quickly and entirely.

For holding the gate closed under the pressure of the cotton seed as well as against its own weight, toggle links 27, 28 are provided pivoted together as at 29 and one, as 27, pivoted at its outer end to the gate and the other, as 28, made fast at its outer end to a horizontal shaft 30 extending across the back of the hopper substantially parallel to the gate. Rotation of this shaft 30, rotates the attached toggle link 28 and consequently swings the other toggle link 27. Preferably the toggle link 28 is provided with a flange 31 which extends past the pivot 29 holding the links together and adapted to engage the other toggle link 27 when the links are brought just past alined position. The pressure of the gate and the contents of the hopper will then hold the toggles from swinging back again, and the gate is therefore held closed. For opening the gate the shaft is rotated, as by a lever 32 secured at one end of the shaft, to pass the toggles through their alined position and toward each other, see Fig. 4. Preferably there are two sets of toggles, one set near each end of the gate operated by the same shaft, and furthermore, it is preferable to provide reinforcing strips 33 extending in a direction from top to bottom of the gate, which strips have outwardly projecting flanges to which, for convenience, the links 27 of the toggles are pivoted. It may furthermore be stated, at this time, that the shaft 30 is rotatably supported by suitable strips 34, 34 attached to the lower edges of the side walls and extending rearwardly beyond the plane of the back wall and forming bracket arms for the purpose, room thus being afforded for the toggles to operate without interfering with the desired amount of swing for the gate.

In order to positively maintain the toggles in position locking the gate closed, and also to cause the gate to close when not held manually open, a tension spring 35 is provided tending to swing the toggles upward or into alined position. This spring is shown substantially midway between the sets of toggles, held at its upper end by a suitable bracket 36 attached to the back wall of the hopper, and secured at its lower end to a brace 37 attached to and extending between the flanged toggle arms 28, 28.

The receiving hopper 2 into which the cotton seed discharges from the weighing hopper, is preferably suspended in fixed position by suitable bars 38 at each corner, spaced sufficiently far apart so as not to interfere with the weighing hopper. Furthermore, the receiving hopper is preferably somewhat wider than the weighing hopper so the cotton seed will not go over the side edges while discharging from the one into the other, and for the same reason the lower edge of the sloping front wall is preferably substantially over the middle of the receiving hopper.

The receiving hopper also preferably provides a vertical rear wall 39 and a front wall the lower part 40 of which slopes rearwardly downward. At the bottom of said walls, where they meet, is provided a screw conveyer 41 which, when rotated, will feed the cotton seed toward one end or side of the hopper where it will fall into a chute 42 and may be disposed of in any way desired. Above the conveyer 41 and adajcent the vertical or back wall 39 of the hopper is a suitable agitator 43 shown as comprising a plurality of blocks 44 bolted to a shaft 45 extending parallel to the conveyer and driven from the same through the agency of suitable sprockets 46, 46 and chain 47 upon the outside of the hopper.

This agitator extends clear across the interior chamber of the receiving hopper, contiguous to the vertical wall 39 of the same, and preferably its blocks 44 also extend the entire length of the agitator although they might under some conditions be made up of shorter spaced sections. The effect of this agitator, located close to the vertical wall as has been stated, is to clear away or loosen the cotton seed adjacent the bottom of said vertical wall, so that that which is above will drop by gravity to the conveyer. It has been found that such a location of the agitator as I have described is far more effective than any other and I desire to be understood as emphasizing this feature of the invention.

By the construction thus described, a cotton seed weighing apparatus is provided which is particularly efficient and adapted for continuous use without clogging or getting out of order. At the same time it enables the cotton seed to be weighed accurately, in quantities varying as the farmers bring their loads to the gin, and such weighing can be done rapidly and with little labor. Many features of the apparatus are old in the art and can be varied by those skilled in the manufacture of such products without departing from the spirit and scope of my invention, and therefore I do not wish to be understood as limiting myself except as to the features set forth in the appended claims.

Having thus described the invention, what I claim is.

1. The combination with a hopper, and a gate closure hinged at its upper edge to one side of the lower end of said hopper, of a toggle link having one end thereof pivotally connected to said gate, a second toggle link having one end thereof pivotally connected to the other end of said first-mentioned toggle link, a rotatable operating shaft spaced from the said side wall of the hopper upon which the gate is hinged and rigidly connected to the said second-mentioned toggle link to force said toggle links into substantial alinement to close the gate, and fold the toggle links to swing the gate into an open position in substantial alinement with the wall of the hopper upon which said gate is hinged, and means for rotating said shaft.

2. The combination with a hopper, and a gate closure hinged at its upper edge to one side of the lower end of said hopper, of a toggle link having one end thereof pivotally connected to said gate, a second toggle link having one end thereof pivotally connected to the other end of said first-mentioned toggle link, a pair of bracket arms projecting outwardly from the said wall of the hopper upon which the gate is hinged, a shaft journaled in said bracket arms in spaced relation to said wall of the hopper and rigidly connected to said second-mentioned toggle link, a spring connected to said toggle links for maintaining them in substantial alinement for closing the gate, and means for rotating said shaft to fold the said toggle links between the said shaft and gate to swing the gate into open position in substantial alinement with the said wall of the hopper upon which the gate is hinged.

3. The combination with a hopper, and a gate closure hinged at its upper edge to one side of the lower end of said hopper, of a toggle link having one end thereof pivotally connected to said gate, a second toggle link having one end thereof pivotally connected to the other end of said first-mentioned toggle link, a rotatable operating shaft journaled upon the said side of the hopper upon which said gate is hinged at a point below the pivotal connection of said first-mentioned toggle link with the gate when the gate is closed, said shaft being rigidly connected to said second-mentioned toggle link, a spring for moving said toggle links into substantial alinement to hold the gate in a closed position, and means for rotating said shaft to fold the toggle links downwardly between the said shaft and said gate to swing the gate into open position in substantial alinement with said wall of the hopper upon which the gate is hinged.

In testimony whereof I have signed this specification in the presence of two subscribing witnesses.

FRANK C. MATTERN.

Witnesses:
WALTER L. BANKS,
H. QUINN.